(12) United States Patent
deCarmo et al.

(10) Patent No.: US 6,415,101 B1
(45) Date of Patent: Jul. 2, 2002

(54) METHOD AND SYSTEM FOR SCANNING AND DISPLAYING MULTIPLE VIEW ANGLES FORMATTED IN DVD CONTENT

(75) Inventors: Linden A. deCarmo, Plantation; Amir M. Mobini, Delray Beach, both of FL (US)

(73) Assignee: Oak Technology, Inc., Sunnyvale, CA (US)

( * ) Notice: Subject to any disclaimer, the term of this patent is extended or adjusted under 35 U.S.C. 154(b) by 0 days.

(21) Appl. No.: 09/122,834

(22) Filed: Jul. 27, 1998

(51) Int. Cl.[7] .......................... H04N 5/781; H04N 5/83
(52) U.S. Cl. ........................ 386/105; 386/125
(58) Field of Search ............................. 386/125, 126, 386/46, 52, 109, 111, 112, 92, 96, 1, 4, 105, 106, 40, 104, 53, 55, 39; 360/32; H04N 5/781, 5/83

(56) References Cited

U.S. PATENT DOCUMENTS 5,999,696 A * 12/1999 Tsuga et al.
6,185,369 B1 * 2/2001 Ko et al.

\* cited by examiner

*Primary Examiner*—Robert Chevalier
(74) *Attorney, Agent, or Firm*—Kudirka & Jobse, LLP

(57) ABSTRACT

A method and apparatus are disclosed within a DVD player that allows multiple view angles to be displayed on a common display with one view angle designated as a primary view and the remaining view angles being subordinated to the primary view angle. The system and method also provide that any Modifications to the primary view similarly affect the secondary views. Any of the secondary views may be selected at any time to become the primary view whereupon the remaining viewing angles are subordinated and synchronized with the newly selected primary view.

18 Claims, 7 Drawing Sheets

METHOD AND SYSTEM FOR SCANNING AND DISPLAYING MULTIPLE VIEW ANGLES FORMATTED IN DVD CONTENT

RELATED APPLICATIONS

This application is one of a number of related applications filed on an even date herewith and commonly assigned, the subject matters of which are incorporated herein by reference for all purposes, including U.S. patent application Ser. No. 09/122,812, entitled METHOD AND SYSTEM FOR CACHING A SELECTED VIEWING ANGLE IN A DVD ENVIRONMENT, by Linden A. deCarmo.

FIELD OF THE INVENTION

This invention relates generally to improvements in digital versatile disc systems and, more particularly, to a system for selecting and defining a primary viewing angle and secondary viewing angles and synchronizing the assorted angles for display.

BACKGROUND OF THE INVENTION

Digital versatile discs (DVDs) are information storage devices used for storing prerecorded audio information, movies and computer software. The storage and playback mechanism used in DVDs closely resembles the mechanism used in compact discs (CDs) and DVD players and software use the same laser technology as CD players. Briefly, both DVDs and CDs store information as a pattern of pits formed in a metallic substrate. The pit patterns form digital words and can be read by shining a laser beam on the disc surface and detecting the reflected beam. However, the information storage capacity of a typical DVD is much higher than a CD. Presently available DVDs have a variety of capacities which depend on the technology used to manufacture the discs. Single-layer technologies can be either single or double-sided with capacities of 4.7 gigabytes and 9.4 gigabytes, respectively. Dual layer technologies will soon be available which use single or double sided capacities that hold approximately 8.5 gigabytes per side. This high information storage capacity makes DVDs suitable for storing not only audio information, but also video information and large amounts of computer data as well.

DVD players have many CD player features, such as the ability to play selections in any order desired and the ability to read information from any point on the disc. However, DVDs can store information in several formats. For example, DVDs which are used to store video information, hereinafter called DVD-VIDEO discs, may use various known information compression algorithms, such as MPEG-2 for video compression/decompression. A DVD may also include high fidelity sound in the form of pulse code modulated data streams which may have varying sample rate. Still other DVD versions (hereinafter called DVD-ROM discs) can store digital data for computer use, and the data may also be compressed on these discs.

With the improved storage capability of DVD content discs, multiple versions of the same subject matter may be stored and interleaved upon the storage disc. Current DVD specifications allows each DVD title to store up to nine viewing angles of the same subject matter. These nine viewing angles may be composed of different subject matter, but when they are the same subject matter, it is advantageous to be able to display multiple views of the same subject matter at the same time. For example, a football coach may wish to see both first and third person views of a play or game in order to see how players perform as individuals and also as a team. Likewise, an instructor may desire to show a group performance and isolate several individual performances within the group in order to compare and contrast the different styles. Unfortunately, all known and currently available DVD players can only display a single angle at a time. As a result, the user(s) must play each angle individually in order to review.

Accordingly, a need exists for a DVD system and method that allows multiple viewing angles from the same content disc to be displayed on a common display. Further, a need exists for a way of selecting a primary viewing angle and then subordinating any additional viewing angles to the primary viewing angle.

SUMMARY OF THE INVENTION

According to the present invention, a method and apparatus are disclosed within a DVD player that allows multiple view angles to be displayed on a common display with one view angle designated as a primary view and the remaining view angles being subordinated to the primary view angle. The system and method also provide that any Modifications to the primary view similarly affect the secondary views. Any of the secondary views may be selected at any time to become the primary view whereupon the remaining viewing angles are subordinated and synchronized with the newly selected primary view.

The DVD apparatus is capable of retrieving multiple views from a DVD content source and displaying these views on a video display connected to the apparatus. The display apparatus includes a parser that is responsive to a data stream retrieved from the DVD content source. The parser extracts multimedia data from the source. The multimedia data includes at least a video data portion, an audio data portion and a subpicture data portion for each of the multiple views. The user selects one of the multiple views to be a primary or a first view. The user then also selects additional views anywhere from one to however many views are possible in the angle block supplied on DVD content. The video decoder is coupled to the parser and is used to display each of the multiple views based on the video data portion parsed out of the data stream. An audio decoder is coupled to the parser and it plays the audio data portion of the primary view only. A subpicture decoder is also coupled to the parser and it is used to display selected menu information for the primary view based on subpicture data portion of the primary view as it is parsed from the data stream. The video decoder displays the primary view in a first window and the successive depending views are displayed in subwindows within the video field. These windows may either be inside the primary window or outside the first window depending upon the selection of the user. In response to any user request, the system modifies the primary view during play and this modification is translated to each of the multiple views also being displayed. In order to have each view play at the same time, the parser synchronizes the primary view to a master clock and then each subsequent secondary view is synchronized to the primary view in time and playback. At any time, the user may select to change the primary view to a new view. During this change, all remaining multiple views and the current primary view becomes subordinated to the newly selected primary view. Additionally, the user may select additional secondary views to display simultaneously with the first primary view if so desired. Each time a secondary view is selected, it is synchronized to the primary view and the remaining multiple views.

The present invention further includes a method for retrieving multiple views from a DVD content source and displaying these views on a video display. The method comprises the steps as follows. Initially, in response to a data stream retrieved from the DVD content source, the parser extracts multimedia data therefrom. Next, the system displays each of the multiple views based on the video data portion corresponding to each of the multiple views. Additionally, the method provides for playing the audio portion of the primary view and for displaying selected menu information for the primary view based upon subpicture data retrieved from the data stream. The method provides that the primary view is displayed in a first window while the remaining views are displayed in secondary windows. These windows for the secondary views may be inside the primary window or outside the primary window depending upon the choice of the user. Anytime a user requests modification of the primary view, the method provides that the primary view be so modified and that each multiple view also be modified in a like manner. The method may be reduced as computer program code for implementation on a computer system capable of operating in a DVD environment. The computer code modifies the system to perform the various methods best described in a newly configured computer environment as directed by the code.

BRIEF DESCRIPTION OF THE DRAWINGS

The above and other features, objects and advantages of the invention will be better understood by referring to the following detailed description in conjunction with the accompanying drawing in which.

DETAILED DESCRIPTION OF SPECIFIC EMBODIMENTS

Figure 1:
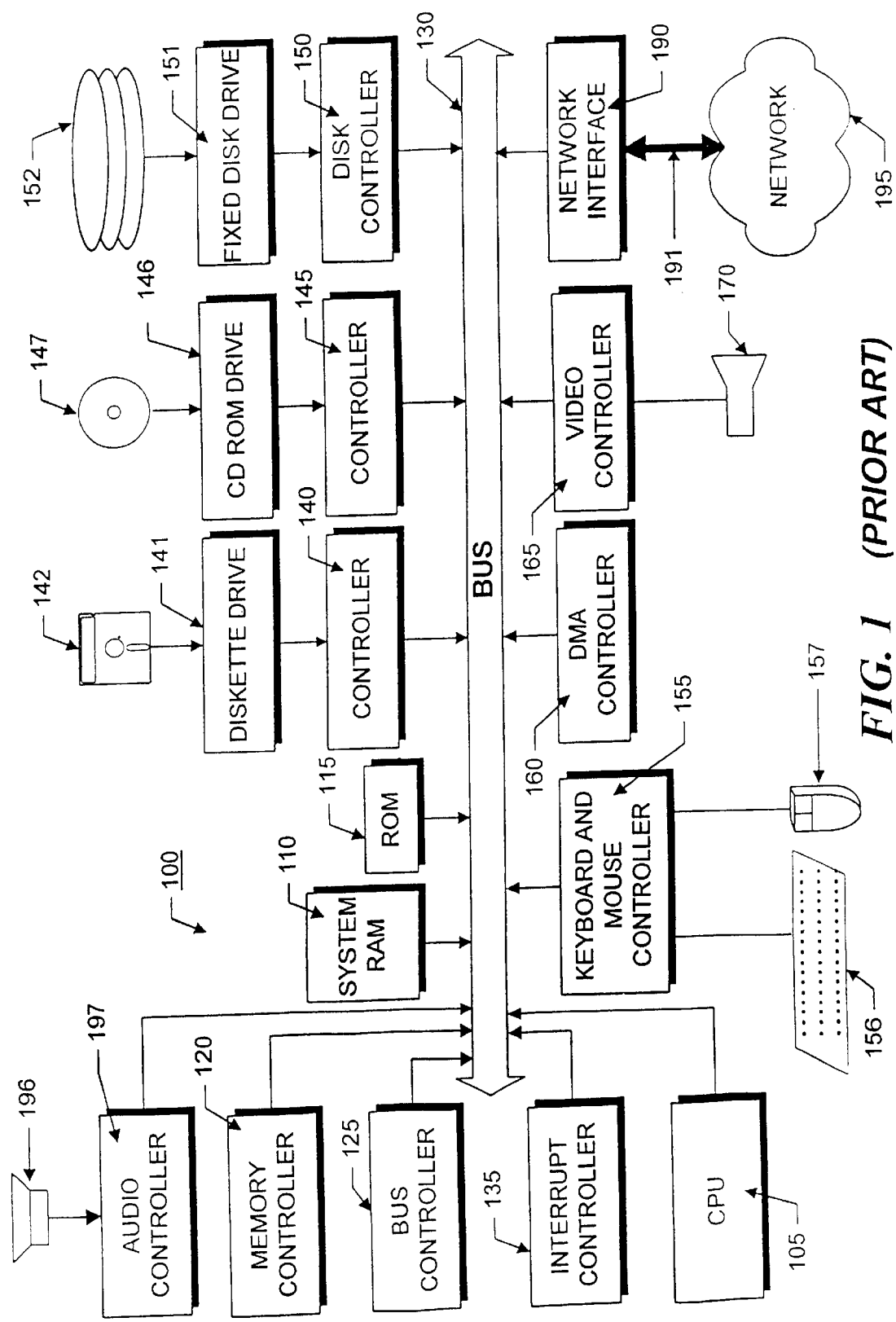
FIG. 1 is a block diagram of a computer system suitable for use with the present invention.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as in IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RAM 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adapter 190 which allows the system to be interconnected to a local area network (LAN) or a wide area network (WAN), schematically illustrated by bus 191 and network 195.

Operation of computer system 100 is generally controlled and coordinated by operating system software, such as the OS/2® operating system, commercially available from International Business Machines Corporation, Boca Raton, Fla., or Windows NT®, commercially available from MicroSoft Corp., Redmond, Wash. The operating system controls allocation of system resources and performs tasks such as processing scheduling, memory management, networking, and I/O services, among things. In particular, an operating system resident in system memory and running on CPU 105 coordinates the operation of the other elements of computer system 100. The present invention may be implemented with any number of commercially available operating systems including OS/2, UNIX, DOS, and WINDOWS, among others. One or more applications such as Lotus NOTES™, commercially available from Lotus Development Corp., Cambridge, Mass. may execute under the control of the operating system. If the operating system 200 is a true multitasking operating system, such as OS/2, multiple applications may execute simultaneously.

Figure 2:
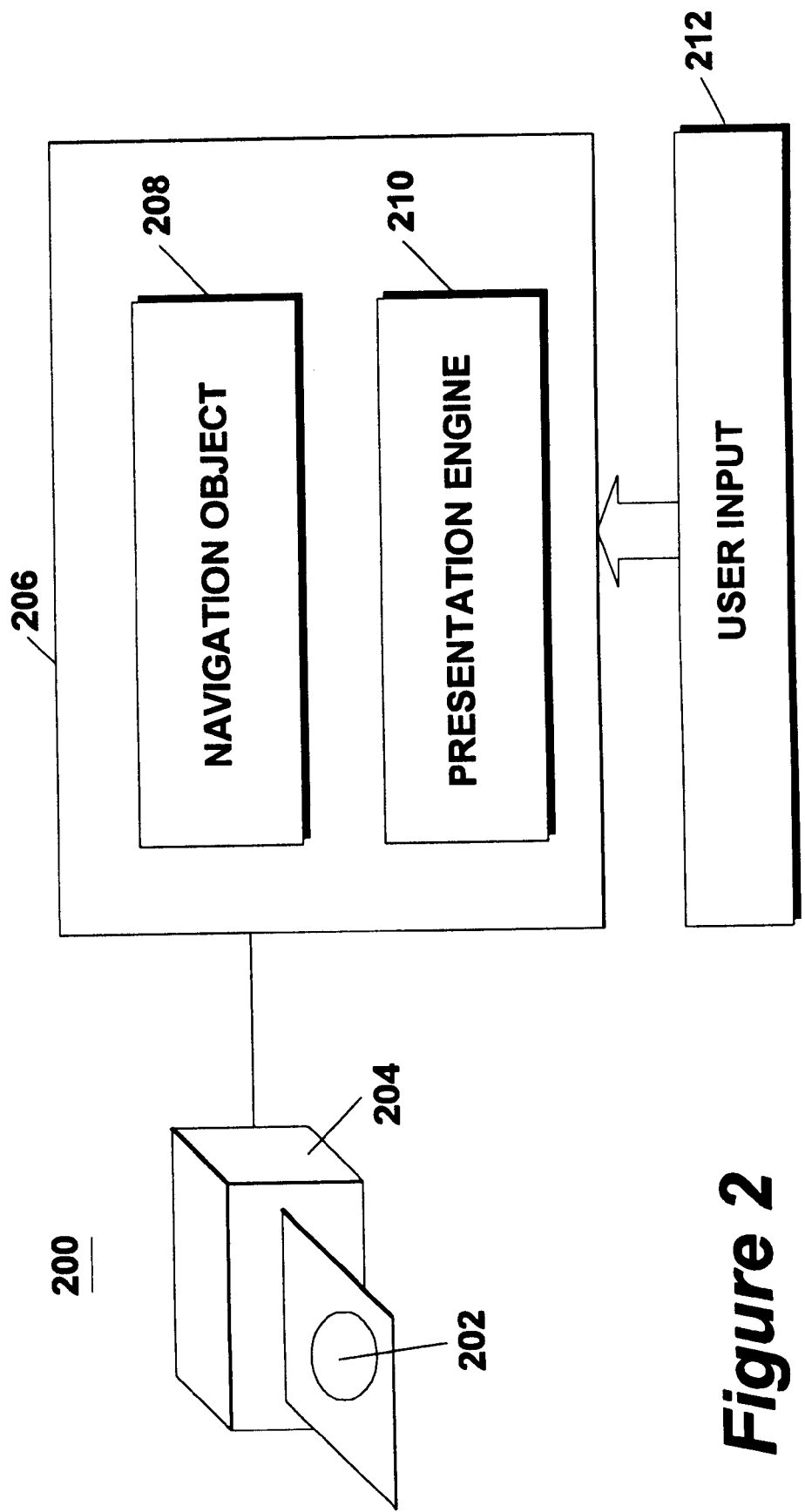
FIG. 2 is a conceptual diagram of the elements comprising the DVD system of the present invention.

FIG. 2 illustrates conceptually the main components of a system 200 in accordance with the present invention. FIG. 2 shows a DVD-ROM drive 204 connected to a computer 206. Use of the DVD-ROM drive 204 with the computer 206 should not be construed as a limitation of the invention, however, since other DVD systems, such as a DVD-VIDEO systems, may be used with many other types of multimedia devices, including television systems. In addition, the DVD-ROM drive 204 may also be a drive suitable for internal mounting in computer 206.

The DVD drive 204 receives a disc 202 containing compressed and encoded information which has been coded in accordance with the DVD 1.0 *Specification for Read-Only Disc* and disk 202 preferably contains up to seventeen gigabytes of information. The computer 206 includes a driver (not shown) for enabling the operating system in the computer 206 to control and exchange information with the drive 204. It also includes one or more input devices 212 which receive input from a user.

The computer 206 also includes a control and playback program shown schematically in FIG. 2 as having a navigation object 208 with logic for reading data from the drive. A presentation engine 210 includes decompressing and decoding routines for decoding the information on the disc 202 and routines for formatting the information for display. For example, the audio information may be compressed by means of conventional compression technique known as Dolby® AC-3® compression (also known as "Dolby® Digital" decompression), and video information may be compressed using a compression technique known as MPEG-2 (Moving Picture Experts Group-2).

In the illustrative embodiment, the software elements of system 200 are implemented using object-oriented programming techniques. As will be understood by those skilled in the art, Object-Oriented Programming (OOP) techniques involve the definition, creation, use and destruction of "objects". These objects are software entities comprising data elements, or attributes, and methods, or functions, which manipulate the data elements. The attributes and related methods are treated by the software as an entity and can be created, used and deleted as if they were a single item. Together, the attributes and methods enable objects to model virtually any real-world entity in terms of its characteristics, which can be represented by the data elements, and its behavior, which can be represented by its data manipulation functions. In this way, objects can model concrete things like people and computers, and they can also model abstract concepts like numbers or geometrical designs.

Objects are defined by creating "classes" which are not objects themselves, but which act as templates that instruct the compiler how to construct the actual object. A class may, for example, specify the number and type of data variables and the steps involved in the methods which manipulate the data. When an object-oriented program is compiled, the class code is compiled into the program, but no objects exist. Therefore, none of the variables or data structures in the compiled program exist or have any memory allotted to them. An object is actually created by the program at runtime by means of a special function called a constructor which uses the corresponding class definition and additional information, such as arguments provided during object creation, to construct the object. Likewise objects are destroyed by a special function called a destructor. Objects may be used by using their data and invoking their functions. When an object is created at runtime memory is allotted and data structures are created.

The principle benefits of object-oriented programming techniques arise out of three basic principles; encapsulation, polymorphism and inheritance. More specifically, objects can be designed to hide, or encapsulate, all, or a portion of, the internal data structure and the internal functions. More particularly, during program design, a program developer can define objects in which all or some of the attributes and all or some of the related functions are considered "private" or for use only by the object itself. Other data or functions can be declared "public" or available for use by other programs. Access to the private variables by other programs can be controlled by defining public functions for an object which access the object's private data. The public functions form a controlled and consistent interface between the private data and the "outside" world. Any attempt to write program code which directly accesses the private variables causes the compiler to generate an error during program compilation which error stops the compilation process and prevents the program from being run.

Polymorphism is a concept which allows objects and functions which have the same overall format, but which work with different data, to function differently in order to produce consistent results. For example, an addition function may be defined as variable A plus variable B (A+B) and this same format can be used whether the A and B are numbers, characters or dollars and cents. However, the actual program code which performs the addition may differ widely depending on the type of variables that comprise A and B. Polymorphism allows three separate function definitions to be written, one for each type of variable (numbers, characters and dollars). After the functions have been defined, a program can later refer to the addition function by its common format (A+B) and, at runtime, the program will determine which of the three functions is actually called by examining the variable types. Polymorphism allows similar functions which produce analogous results to be "grouped" in the program source code to produce a more logical and clear program flow.

The third principle which underlies object-oriented programming is inheritance, which allows program developers to easily reuse pre-existing programs and to avoid creating software from scratch. The principle of inheritance allows a software developer to declare classes (and the objects which are later created from them) as related. Specifically, classes may be designated as subclasses of other base classes. A subclass "inherits" and has access to all of the public functions of its base classes just as if these function appeared in the subclass. Alternatively, a subclass can override some or all of its inherited functions or may modify some or all of its inherited functions merely by defining a new function with the same form (overriding or modification does not alter the function in the base class, but merely modifies the use of the function in the subclass). The creation of a new subclass which has some of the functionality (with selective modification) of another class allows software developers to easily customize existing code to meet their particular needs.

In accordance with the principles of the present invention, the DVD system is enabled to display simultaneously two or more angles from a single DVD content source on a video display. A data stream is read from the DVD content source by the DVD player. A main video picture is selected by the user and parsed out for display. This main video picture is defined as the primary angle or the primary view. It may also be defined as a first view. The remaining angles are referred to as secondary angles or secondary views. At least one secondary angle is maintained and as many as N minus 1 secondary angles may be displayed where N is the total number of angles stored in the DVD content.

Figure 3:
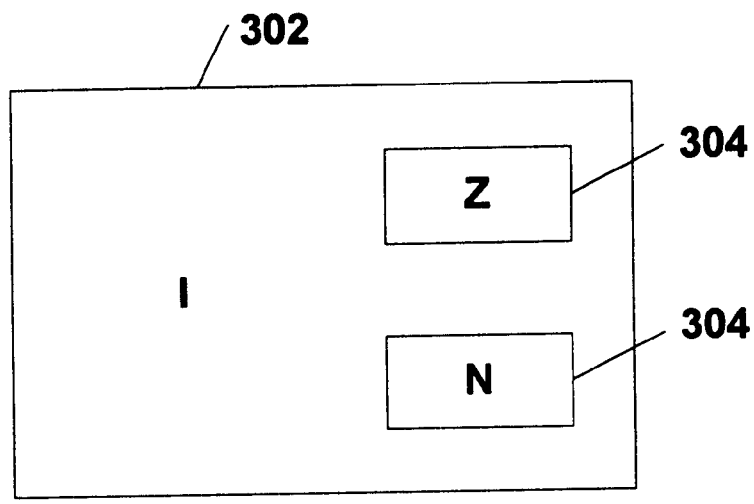
FIG. 3 is a conceptual block diagram of a video screen depicting angles-in-angle display according to the present invention.

An example of a display showing both a primary angle and a secondary angle is shown in FIG. 3. Primary angle 302 is the main angle and within primary angle 302 is located a secondary angle 304, also known as angle-in-angle viewing. The size of secondary angle 304 may be adjusted or relocated within primary angle 302 in order to minimize the disturbance that secondary angle 304 has on primary angle 302. Additional viewing angles 304 may also be supplied and with their size and location within primary angle 302 adjusted to allow for reasonable view of the primary angle 302 and the other secondary views 304. Each of secondary viewing angle 2 through N is viewed in a separate logical window.

When establishing the angle-in-angle display, the data is selected from the DVD content source as the data stream is read by the DVD player. The manipulation of the DVD stream is further described in U.S. patent application Ser. No. 08/926,883 entitled "METHOD AND APPARATUS FOR DYNAMICALLY CONSTRUCTING A GRAPHIC USER INTERFACE FROM A DVD DATA STREAM," commonly assigned with the present invention and herein incorporated by reference for all purposes. Furthermore, the manipulation and control of the various viewing angles may be implemented using multiple independent threads, which are further defined in U.S. patent application Ser. No. 09/014,480 entitled "DVD NAVIGATION SYSTEM WITH MULTIPLE INDEPENDENT THREADS," commonly assigned with the present invention and incorporated by referenced herein for all purposes.

When utilizing a DVD stream containing multiple angles, certain observations are necessary. First, although the stream may contain, under current DVD specifications, a maximum of nine viewing angles, the illustrative embodiment has no restriction on the maximum number of viewable angles and therefore the system is capable of handling N angle views. Further, each angle block group of cells with each cell containing data for different angle, must contain the same number of cells as all other angle blocks in the title. Furthermore, each cell in an angle block indicates if it supports seamless or nonseamless angle changes. Seamless angle changes are those that are responded to instantly upon request while nonseamless angle changes require a wait period before implementation can occur.

Figure 4:
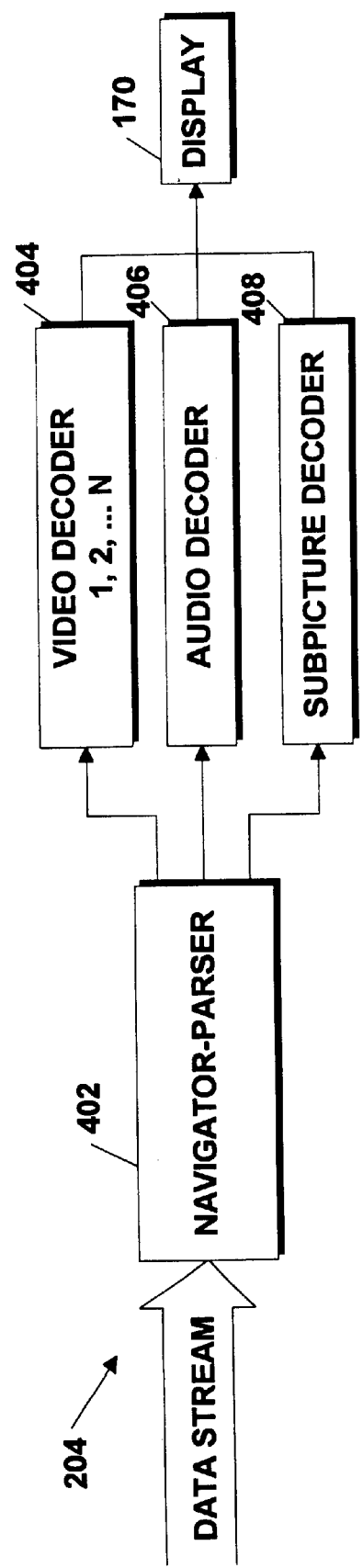
FIG. 4 is a conceptual diagram of additional elements of the DVD system of FIG. 2.

The DVD player includes additional processing and decoding elements as shown in FIG. 4. FIG. 4 is a partial block diagram of DVD player 204. DVD player 204 further comprises a navigator-parser unit 402 that receives the DVD stream, parses the DVD stream and routes compressed multimedia information for each viewing angle to the appropriate system target decoder (STD). These STDs include a video decoder, an audio decoder and a subpicture decoder, as well as other decoders that may be supplied for various functions. A video stream parsed from the DVD stream is sent to video decoder 404, which is responsible for decompressing the MPEG video stream for each angle. The system may use a single physical video decoder that is able to emulate multiple logic video decoders where one logical video decoder is defined for each angle selected. Audio decoder 406 is responsible for decompressing the audio portion of the data stream associated with the primary angle parsed from the data stream. The audio may be encoded in either AC-3 audio, MPEG audio, or Pulse Code Modulation—uncompressed audio streams. A subpicture decoder 408 is provided and is responsible for decompressing the subpicture data and displaying the subpicture data on the screen. Subpicture data defines the icons and buttons that allow the user to manipulate the video screen such as either slow the display, stop the display, fast forward the display, or other manipulation of the screen. In the illustrative embodiment, the primary viewing angle may be still manipulated. Whenever the primary angle is manipulated, the same action is performed for each of the viewing angles displayed on the video display.

Figure 5:
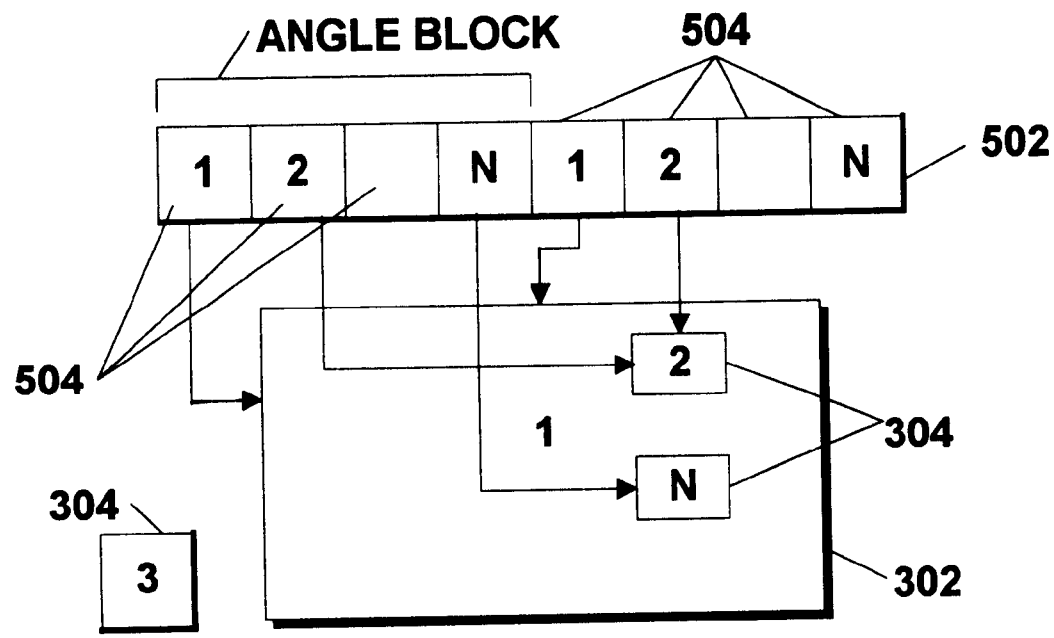
FIG. 5 is a schematic diagram illustrating the parsing of data from angle blocks to display the multiple views of FIG. 3.

FIG. 5 depicts in block diagram form an overview of how angles are retrieved from the DVD ROM player and then displayed with the angle-in-angle structure. Primary angle 302 has one or more secondary angles 304, designated 1 through N, within its borders. As illustrated, N angles 504 are interleaved throughout the content stream 502. The primary angle 302 fills most of the display while the secondary angles 304 located within the primary angle. In order to simplify and eliminate conflicts in viewing multiple angles, certain restrictions may be imposed. First, only the primary angle may execute a navigational command. Second, only the primary viewing angle is allowed to play the audio. Third, only the subpicture information, i.e., icons and interface buttons, for the primary angle is supplied to the video display and available for manipulation. Each secondary view is displayed in a separate window, which may be independently moved or resized, or both. In the illustrative embodiment, the user has no controls over the secondary angles, but each secondary angle responds to the manipulation of the primary angle. Secondary angles may be created or destroyed at any point in time. Fourth, the user may select a new primary angle from any of the currently displayed secondary angles or other secondary angle with the remaining angles being subordinated to the newly selected primary angle. This newly selected primary angle will have the same advantages as the original primary angle, i.e., the manipulation of the primary angle controls the secondary angles, audio is selected from this new primary angle, and the subpicture controls are presented only for this new primary angle.

Figure 6:
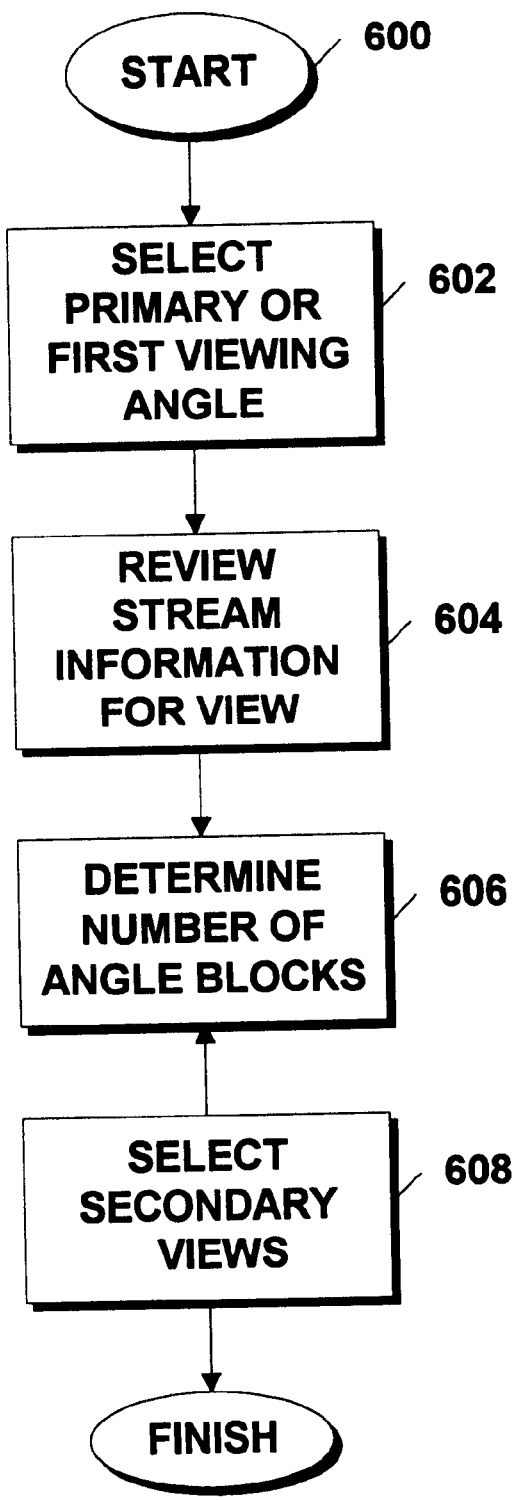
FIG. 6 is a flowchart illustrating the method of selecting a primary angle and additional secondary angles.
Figure 7:
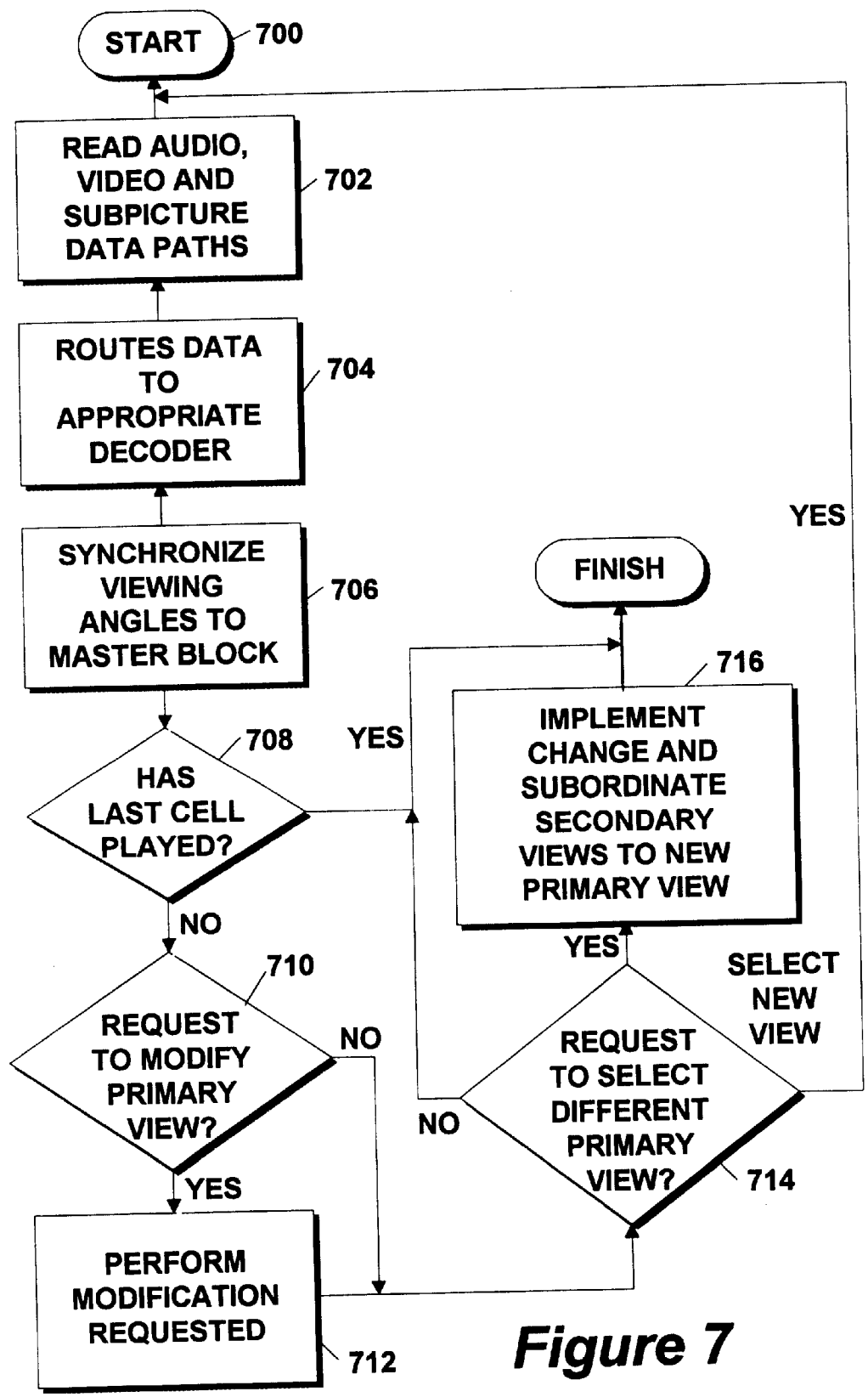
FIG. 7 is a flowchart illustrating the method of streaming the primary angle data and subordinating the secondary views thereto.
Figure 8:
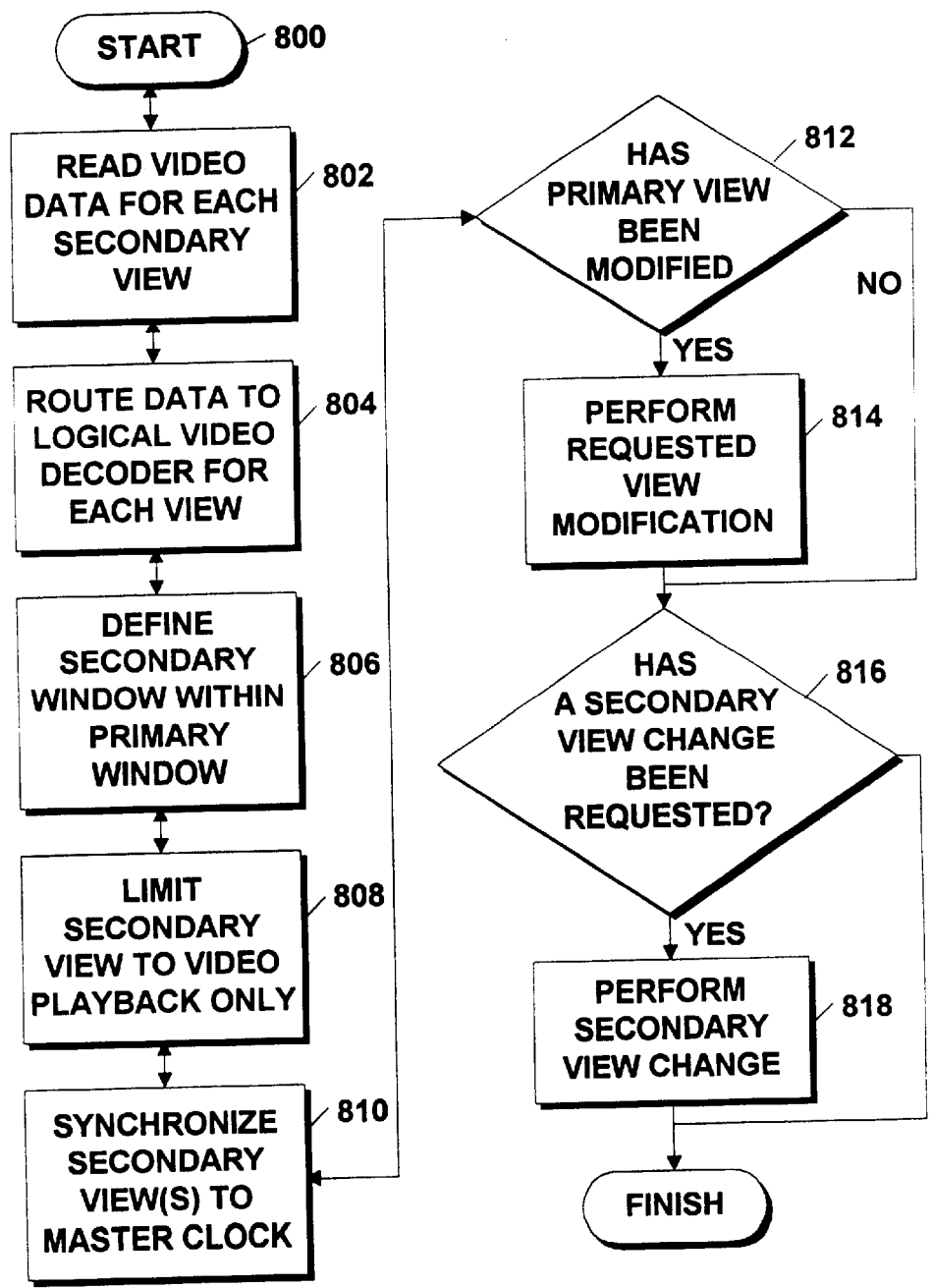
FIG. 8 is a flowchart illustrating the method of monitoring and displaying the secondary views within the domain of the primary view.

The implementation and processing of the multiple viewing angles is described in the flow charts of FIGS. 6–8. FIG. 6 illustrates the process of the initial request to show a primary angle and to select various secondary angles. FIG. 7 illustrates the process of management of the data stream and the processing of the content to display the primary viewing angle. FIG. 8 illustrates the process of the selection and manipulation of the content to display the secondary angle blocks.

In FIG. 6, the process begins in step 600 and proceeds to step 602 where the user enables the angle-in-angle system by selecting a primary angle for view. Next, in step 604, the navigator-parser unit 402 reviews the stream information for processing. Next, in step 606, the navigator-parser unit 402 determines the number of angle blocks that exists before proceeding to step 608 where the user selects the desired number of secondary views. Once the total number of views are selected, the system proceeds to FIG. 7 for processing the primary viewing angle content.

In FIG. 7, the system begins at step 700 and proceeds to step 702 where navigator-parser unit 402 reads from the content the audio, video and subpicture data within the primary angle block or first view. Next, in step 704, the navigator-parser unit 402, i.e., the system for purposes of FIGS. 6–8, routes this data to the appropriate audio decoder 408, video decoder 406 and subpicture decoder 410. Next, in step 706, the system synchronizes each angle within a view based on a master clock within the DVD system. The master clock may be selected from any of the primary views and decoders of FIG. 4. Proceeding to step 708, the system determines whether the last cell of data for the primary angle view has been displayed. If so, the system stops the video display for not only the primary angle, but for all secondary angles. If the last primary cell has not been displayed, then the system continues the display mode until the last cell has been reached. At any time, in step 710, the system determines whether the user has requested modification of the primary view in any manner. These modifications may include such actions as pausing the display, stopping the display, rewinding or fast forwarding the display, or other modifications. Upon detection of a view modification, the system, in step 712, carries out the modification requested and performs the same modification not only on the primary view, but on each secondary view as well. Additionally, at any time during the viewing, the system, in step 714, monitors the users input to determine whether the user has requested a change in the primary view. If a change has been noted, the system proceeds to step 716 where the system subordinates the original primary view to the newly selected primary view and synchronizes all the remaining secondary views to the newly selected primary view. If the primary view is not one of the originally selected secondary views, the system then retrieves the DVD content per step 702 and the system follows the remaining steps in FIG. 7.

FIG. 8 describes the process for managing the secondary views. Beginning in step 800, the system proceeds to step 802 where the system reads the video data for each secondary angle within the secondary angle blocks. In step 804, this information is routed to the video decoder 406 associated with the particular view. Next, in step 806, the system defines the information sent to the appropriate secondary video decoder to require that the secondary video decoder present this angle information in a secondary window 304 of the primary viewing window 302. Next, in step 808, the system determines that each secondary view will not respond to any navigational commands or audio or subpicture packets associated with the secondary angle. These features are reserved solely for the primary view. Next, in step 810, the system maintains proper synchronization of all views to the master clock selected in FIG. 7. In step 812, the system determines whether the primary stream has been modified by a user request. If such a modification has been requested, the system, in step 814, performs the modification not only on the primary view but on each secondary view currently being displayed. At any time during the display, the system determines, in step 816, whether the user has requested a change in the number of secondary views. If secondary view change has been requested, the system proceeds to step 818 to perform the change requested. Such change may be either to move the secondary window to a different location on the primary window field, to close the window, or to open a newly-selected secondary view.

If a single physical video decoder is being used within the DVD playback system for the angle-in-angle support, then all views must be presented in I frame mode and no audio or subpicture will be presented for any of these views. I frame refers to intracoded frames that are reference frames that have no dependency on other frames for decoding and displaying. If multiple physical decoders are used, or if the decoder is capable of simultaneously decoding multiple streams, then the requirement that each view be presented in I frame mode is not required. Additionally, it is desirable that each logical video decoder be able to adjust dynamically its frame rate to accommodate multiple views under different bandwidth conditions or display I frames only for all views in order that synchronization may be maintained.

The above-described invention may be implemented in either all software, all hardware, or a combination of hardware and software, including program code stored in firmware format to support dedicated hardware. A software application suitable for implementing the present invention in is the Interactive DVD Browser (IDB), Version 1.0 and thereafter, commercially available from Oak Technology, Inc., Sunnyvale, Calif.

A software implementation of the above described embodiment(s) may comprise a series of computer instructions either fixed on a tangible medium, such as a computer readable media, e.g. diskette 142, CD-ROM 147, ROM 115, or fixed disk 152 of FIG. 1, or transmittable to a computer system, via a modem or other interface device, such as communications adapter 190 connected to the network 195 over a medium 191. Medium 191 can be either a tangible medium, including but not limited to optical or analog communications lines, or may be implemented with wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although various exemplary embodiments of the invention have been disclosed, it will be apparent to those skilled in the art that various changes and modifications can be made which will achieve some of the advantages of the invention without departing from the spirit and scope of the invention. It will be obvious to those reasonably skilled in the art that other components performing the same functions may be suitably substituted. Further, the methods of the invention may be achieved in either all software implementations, using the appropriate processor instructions, or in hybrid implementations which utilize a combination of hardware logic and software logic to achieve the same results. Further, aspects such as the size of memory, number of bits utilized to represent datum or a signal, data word size, the number of clock cycles necessary to execute an instruction, and the specific configuration of logic and/or instructions utilized to achieve a particular function, as well as other modifications to the inventive concept are intended to be covered by the appended claims.

What is claimed is:

1. In a DVD playback system, an apparatus for retrieving multiple views from a DVD content source and displaying the views on a display, the apparatus comprising:

a parser responsive to a data stream retrieved from the DVD content source for extracting multimedia data therefrom, the multimedia data comprising at least a video data portion, an audio data portion and a subpicture data portion for each of the multiple views, at least one of the multiple views being selectable as a primary view;

a video decoder, coupled to the parser, to display each of the multiple views based on the video data portion corresponding to each of the multiple views;

an audio decoder, coupled to the parser, to play the audio data portion of the primary view; and a subpicture decoder, coupled to the parser, to display selected menu information for the primary view based upon the subpicture data portion of the primary view based upon the subpicture data portion received from the parser.

2. The apparatus according to claim 1 wherein the video decoder displays the primary view video data in corresponding secondary windows.

3. The apparatus according to claim 1 wherein the parser, in response to a user request, modifies the primary view during playback and each of the multiple views being displayed.

4. The apparatus according to claim 1 wherein the parser synchronizes the primary view to a master clock with each of the remaining multiple views being synchronized to the primary view.

5. The apparatus according to claim 1 wherein the parser, in response to a user request, changes the primary view to a newly selected primary view while maintaining the remaining multiple views.

6. The apparatus according to claim 5 wherein the parser synchronizes the newly selected primary view with the remaining multiple views.

7. In a DVD playback system a method for retrieving multiple views from a DVD content source and displaying the views on a display, the method comprising:

responsive to a data stream retrieved from the DVD content source, extracting multimedia data therefrom, the multimedia data comprising at least a video data portion, an audio data portion and a subpicture data portion for each of the multiple views, at least one of the multiple views being selectable as a primary view;

displaying each of the multiple views based on the video data portion corresponding to each of the multiple views;

playing the audio data portion of the primary view; and displaying selected menu information for the primary view based upon the subpicture data portion of the primary view based upon the subpicture data portion received from the parser.

8. The method according to claim 7 further comprising:

displaying the primary view video data in a first window; and, displaying each remaining view of the multiple views in corresponding secondary windows.

9. The method according to claim 7 further comprising the step of:

in response to a user request, modifying the primary view during playback and each of the multiple views being displayed.

10. The method according to claim 7 further comprising the step of:

synchronizing the primary view to a master clock with each of the multiple views being synchronized to the primary view.

11. The method according to claim 7 further comprising the step of, in response to a user request, changing the primary view to a newly selected primary view while maintaining the remaining multiple views.

12. The method according to claim 11 further comprising the step of synchronizing the newly selected primary view with the remaining multiple views.

13. A computer program product for use with a DVD playback system having a display, the computer program product comprising a computer usable medium having computer useable code thereon for retrieving multiple views from a DVD content source and displaying the views on a display, the computer program product comprising:

program code for extracting multimedia data from a DVD content source, the multimedia data comprising at least a video data portion, an audio data portion and a subpicture data portion for each of multiple views, at least one of the multiple views being selectable as a primary view;

program code for displaying each of the multiple views based on the video data portion corresponding to each of the multiple views;

program code for playing the audio data portion of the primary view; and program code for displaying selected menu information for the primary view based upon the subpicture data portion of the primary view based upon the subpicture data portion received from the parser.

14. The computer program product according to claim 13 further comprising:

program code for displaying the primary view video data in a first window; and, program code for displaying each remaining view of the multiple views in corresponding secondary windows.

15. The computer program product according to claim 13 further comprising:

program code for modifying the primary view during playback and each of the multiple views being displayed.

16. The computer program product according to claim 13 further comprising:

program code for synchronizing the primary view to a master clock with each of the multiple views being synchronized to the primary view.

17. The computer program product according to claim 16 further comprising:

program code for changing the primary view to a newly selected primary view while maintaining the remaining multiple views.

18. The computer program product according to claim 13 further comprising:

program code for synchronizing the newly selected primary view with the remaining multiple views.

* * * * *